US012641197B2

(12) United States Patent     (10) Patent No.:    US 12,641,197 B2

Manzanera Lidón         (45) Date of Patent:      May 26, 2026

(54) SYSTEM FOR BROADCASTING VOLUMETRIC VIDEOCONFERENCES IN 3D ANIMATED VIRTUAL ENVIRONMENT WITH AUDIO INFORMATION, AND PROCEDURE FOR OPERATING SAID DEVICE

(71) Applicant: TMRW Spain SLU, Alicant (ES)

(72) Inventor: Jesús Manzanera Lidón, Alicante (ES)

(73) Assignee: TMRW Spain SLU, Alicante (ES)

( * ) Notice: Subject to any disclaimer, the term of this patent is extended or adjusted under 35 U.S.C. 154(b) by 300 days.

(21) Appl. No.: 18/273,531

(22) PCT Filed: Jan. 17, 2022

(86) PCT No.: PCT/EP2022/050850

§ 371 (c)(1),
(2) Date: Jul. 20, 2023

(87) PCT Pub. No.: WO2022/157105

PCT Pub. Date: Jul. 28, 2022

(65) Prior Publication Data

US 2024/0015264 A1     Jan. 11, 2024

(30) Foreign Application Priority Data

Jan. 22, 2021    (EP) .................................... 21382053

(51) Int. Cl.
*H04N 7/15*        (2006.01)
*G06T 7/70*        (2017.01)
(Continued)

(52) U.S. Cl.
CPC .............. *H04N 7/157* (2013.01); *G06T 7/70* (2017.01); *H04N 7/147* (2013.01); *H04N 7/15* (2013.01);
(Continued)

(58) Field of Classification Search
None
See application file for complete search history.

(56) References Cited

U.S. PATENT DOCUMENTS 9,007,422 B1    4/2015   Kwon et al.
2014/0218473 A1   8/2014   Hannuksela et al.
(Continued)

OTHER PUBLICATIONS

Cha Zhang et al., "Viewport: A Distributed, Immersive Teleconferencing System with Infrared Dot Pattern", IEEE Multimedia, IEEE Service Center, New York, NY, US, vol. 20,I No. 1, Jan. 1, 2013 (Jan. 1, 2013), pp. 17-27, XP011493977, ISSN: 1070-986x, DOI: 10.1109/MMUL.2013.12.

*Primary Examiner* — Quoc D Tran
(74) *Attorney, Agent, or Firm* — BRYAN CAVE LEIGHTON PAISNER LLP

(57)           ABSTRACT

Systems and methods for broadcasting volumetric information from a first location to a second location. The system may include a server and an emitter. The emitter is configured to capture a scene, render three-dimensional information based on the scene, and transmit the three-dimensional information to the server. The system includes a configuration application including a broadcast setting. The broadcast setting includes at least one of framerate information, field-of-view information, or spatial resolution information. The system includes a receiving device configured to render a three-dimensional environment. The server is configured to transmit the three-dimensional information to the receiving device. The three-dimensional information rendered by the emitter includes a 3D mesh defining an image comprising volumetric information of an object and/or a person within the scene. The configuration application is configured to control a compression level of the audio information and a compression level of video information of the three-dimensional information.

24 Claims, 3 Drawing Sheets

(51) Int. Cl.

| | | |
|---|---|---|
| *H04N 7/14* | (2006.01) | |
| *H04N 13/161* | (2018.01) | |
| *H04N 13/194* | (2018.01) | |

(52) U.S. Cl.
CPC ......... *H04N 13/161* (2018.05); *H04N 13/194* (2018.05); *G06T 2207/20221* (2013.01)

(56) References Cited

U.S. PATENT DOCUMENTS

| | | | |
|---|---|---|---|
| 2015/0092014 A1* | 4/2015 | Kariti ..................... | H04N 5/265 348/14.09 |
| 2016/0364904 A1 | 12/2016 | Soon-Chul et al. | |
| 2018/0101966 A1* | 4/2018 | Lee .................... | H04N 21/6587 |
| 2019/0043621 A1 | 2/2019 | Celmins et al. | |
| 2019/0294124 A1 | 9/2019 | Law et al. | |
| 2020/0304758 A1* | 9/2020 | Valli ...................... | H04N 7/157 |
| 2022/0070237 A1* | 3/2022 | Yerli .................... | G06T 19/003 |

* cited by examiner

SYSTEM FOR BROADCASTING VOLUMETRIC VIDEOCONFERENCES IN 3D ANIMATED VIRTUAL ENVIRONMENT WITH AUDIO INFORMATION, AND PROCEDURE FOR OPERATING SAID DEVICE

CROSS-REFERENCE TO RELATED APPLICATION

This application is a National Phase entry pursuant to 35 U.S.C. 371 of International Application No. PCT/EP2022/050850 filed on Jan. 17, 2021, which claims priority to and the benefit of European Application No. 21382053.3 filed on Jan. 22, 2021, the disclosure of which is incorporated herein by reference in its entirety.

TECHNICAL FIELD

The disclosure refers to the field of video communications and, more specifically, volumetric videoconferences wherein three-dimensional (3D) representations of human users (e.g., in motion or performing an activity) are provided, such that a volumetric environment is visualised in real time on different platforms, such as mobile phones, smart tv, tablets, etc.

BACKGROUND

At present, several companies (such as Imverse and Depthkit) are working on the development of devices providing a volumetric capture of human users by means of conventional depth cameras connected to a computer. The system proposed by Imverse (Mange, R., & Zabala, K. I. (2018), "*IMVERSE livemaker: create a 3D model from a single 2D photo inside VR*", ACM SIGGRAPH 2018 Studio, pp. 1-25) provides a device for generating 3D environments from locations and manipulating assets in real time, from two-dimensional (2D) images. Depthkit has developed a volumetric filmmaking toolkit (Simile, Inc. 2017, available at www.depthkit.tv).

The systems proposed by Imverse and Depthkit are of high quality. However, they require intensive graphical processing, which hinders broadcasting to thousands of users in real time. In particular, these devices rely on capturing both a depth and a colour video of a scene, which are processed by an equipment (a computer, or a server) to which they are connected. In case that these systems require transmitting said data to another device, they send the depth and the colour video separately in order that the receiver could reconstruct the 3D image of the scene. Consequently, if a receiving device collects information from several devices simultaneously, it must process a high amount of data (video streams), thus entailing relevant computing requirements. These systems are very expensive and complex to configure, requiring high computing resources of a high degree of fine tuning to make them work properly. Moreover, audio transmission capability is not included in these systems.

In this context, there are several proposals disclosing videoconference systems wherein the audio transmission capability is included in said systems. For example, the American patent application US 2020/0304758 A1 relates to augmented-reality telepresence systems, that include a first-location participant at a first location and a second-location participant at a second location, each location having respective pluralities of cameras and display segments, wherein a line-of-sight augmented-reality experience that includes audio information is generated. Likewise, the U.S. PGPUB No. US 2015/0092014 A1 relates to a videoconference system, wherein communication links are established over a packet network between a server and plurality of client computers, the server receiving from and transmitting to the client computers audio packets and video packets. Also, the U.S. PGPUB No. US2019/0043621 A1 relates to a telemedicine system including a cart that allows for two-way audio/video conferencing between patients or local care providers, and remote care providers or family members. However, none of these systems can solve the problem of reducing the processing and bandwidth requirements for broadcasting volumetric information in the videoconference and, at the same time, enhancing and optimising the exploitation of depth information in the receiving sites of said systems.

With the limitations described in the preceding paragraphs it becomes thus necessary, in the present technical field, to provide a 3D videoconference system which further considers the audio stream and massive broadcasting to multiple end users or devices, while being easy-to-configure for an average end user without advanced computer knowledge.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

To this end, the present disclosure proposes a decentralised system based on mesh processing, which comprises one or more devices (or "emitters") having depth cameras integrated into their own hardware. These devices oversee capturing mesh processing and transmission, without the need of a final receiving device. This avoids redundant data processing since, if the transmission is made to a plurality of receivers, only one mesh is processed in the device. Contrary to this approach, in the described cases of Imverse and Depthkit, the same mesh must be processed in each receiver, thus considerably reducing the overall performance of the system. In this way, a local representation of a 3D scene (volumetric information, audio and/or additional information) is transmitted through a network (either local or Internet) to a remote location.

The object of the present disclosure thus relates, without limitation, to a decentralised system for broadcasting 3D videoconferences which does not require processing the received data, thereby enabling sending of more transmissions to each receiver. Furthermore, the disclosure allows broadcasting information to different places simultaneously, thanks to the use of a central server in charge of distributing the transmissions already processed to the different receivers that request them.

The system of the disclosure is portable and only requires its connection to the Internet or to another network to broadcast a videoconference. In this way, the claimed disclosure allows remote collaboration during videoconferences, further including audio broadcasting. The audio information may comprise not only the audio recording from a speaker with a microphone, but also environmental audio information in the scene (background sounds, etc.).

The system serves for broadcasting local volumetric information of a three-dimensional scene, from a first location to a remote location. More particularly, the information transmitted comprises preferably a videoconference taking place at a three-dimensional virtual or augmented reality environment. Said system comprises, at least:

An emitter adapted to capture, render, and send three-dimensional information of the scene to a server.

A configuration application which controls one or more broadcasting settings, like the framerate, the field-of-view which is transmitted in the videoconference, and/or the spatial resolution of the transmission.

A server adapted to receive the three-dimensional information of the scene from the emitter and transmit said information to at least one receiving device configured with a receiving application.

A receiving device configured with a receiving application which renders a three-dimensional environment wherein the information received from the emitter is displayed. For instance, the receiver may display a virtual room in which the information about a first location is projected (i.e., 3D representations of people and objects).

This system is characterized by the following features that distinguish it from other known systems in the field:

The three-dimensional information rendered by the emitter comprises a plurality of 3D meshes with volumetric information of the placement of objects and/or people within a scene. By storing the information of the scene as a compact mesh file, the broadcast can be easily transmitted over a network in real-time.

The three-dimensional information rendered by the emitter further comprises audio information of the scene (either the audio corresponding to a speaker or environmental sound of the scene).

The server processes the information received from the emitter and transmits said information to receivers encoded as a compressed file containing various mesh frames.

The configuration application further enables configuring the compression level of the three-dimensional video information and audio information broadcast in the system, depending on the bandwidth available for the videoconference.

In a preferred embodiment of the disclosure, the emitter of the system comprises, at least:

A depth sensing module adapted to obtain information about the position of an object and/or people within the three-dimensional scene.

An audio acquisition module adapted to record sound information of the scene.

A data processing board which comprises a vision processor, an audio processor, a CPU, RAM, internal memory, a high-speed connectivity module, a power supply and, optionally, a GPU. Said board is adapted to process the information received from the depth sensing module and/or the audio acquisition module before transmitting it to the server.

In another preferred embodiment of the disclosure, the emitter further comprises a colour sensor acquiring colour information of the scene and/or a thermal sensor, and even additional sensors. In these cases, the data processing board is further adapted to process said colour, thermal or additional information before transmitting it to the server. Preferably, the colour image must have higher resolution than the depth image and the colour sensor must provide a similar frame acquisition as the depth sensing module.

In a further preferred embodiment of the disclosure, the depth sensing module comprises an infrared emitter and at least two infrared (IR) sensors and, provided that the distance between both sensors is known, the distance between the module and the grid of IR points projected onto the environment by the emitter can be precisely calculated. Alternatively, in certain embodiments of the disclosure the depth sensing module comprises a LIDAR (Light Detection and Ranging) sensor. Advantageously, the IR or LIDAR sensors provide the disclosure with depth images representative of a scene or a field-of-view thereof. The LIDAR sensor comprises both the emission and detection steps of a laser source suitable for inspecting the scene.

In yet another preferred embodiment of the disclosure, the audio acquisition module comprises a cardioid unidirectional microphone and/or a surround sound equipment. Particularly, the cardioid microphone provides a better detection of the audio from a source in front of the microphone, which is convenient when it comes to acquire the audio input from a speaker (person) in a videoconference. In those cases, the environmental sound must be attenuated, and this kind of microphone carries out this task conveniently. Otherwise, when the environmental sound needs to be broadcasted, then a surround system equipment can be used instead.

In addition to the above features, certain embodiments of the disclosure advantageously comprise a global shutter (or similar functionality to mitigate motion artifacts) in, at least, the colour sensor and/or the depth sensing module.

A second object of the disclosure relates to a method for broadcasting a three-dimensional videoconference, characterized in that it comprises the use of the system described above and wherein the emitter of said system is configured to perform the following steps:

Arranging the configuration settings of the depth sensing module and the audio acquisition module, via the configuration application, said settings comprising at least one of the following: the framerate, the spatial-resolution of the broadcast image, the field-of-view of the scene which is transmitted in the videoconference, the encoding, and the compression algorithm for the video and/or audio.

Acquiring information of a three-dimensional scene, as a depth image and audio data, by means of the depth sensing module, and the audio acquisition module.

Reading and processing, via a vision processor, the volumetric information of the scene obtained with the depth sensing module; wherein said processing involves cleaning and filtering the three-dimensional mesh.

Reading and processing, via the audio processor, the audio information gathered by the audio acquisition module to obtain a processed audio stream according to the configuration application settings.

Converting the depth image into a colourless point cloud wherein the depth information of the scene is encoded in a dimension of said point cloud.

Converting the point cloud into a three-dimensional mesh comprising a plurality of triangles and vertices by using Poisson surface algorithms.

Compressing the three-dimensional mesh according to the configuration application settings.

Synchronizing the compressed three-dimensional mesh files and the audio stream.

Sending the synchronized mesh files along with the corresponding audio stream to the server.

In a preferred embodiment of the method described above, the step of acquiring volumetric information of the three-dimensional scene comprises the following sub-steps:

Spatially discretizing the scene, for instance, as a grid. In this way, the scene is divided into a set of points, each of them is then sampled as follows.

Emitting an infrared dot pattern with the infrared emitter or the LIDAR sensor (or other sensor of the depth sensing module), such that each point of the scene grid is inspected.

Detecting, by means of the infrared sensors or the LIDAR sensor (or other sensor of the depth sensing module), the reflected IR dot pattern with regard to the infrared emitter position to obtain the three-dimensional positioning of each dot within the scene.

In preferred embodiments of the method described above, the step of filtering the 3D mesh comprises at least one of the following operations: applying segmentation algorithms to define a field-of-view in the scene by discarding those scene portions beyond a maximum depth threshold, smoothing the image to avoid unnatural changes between different depths, performing brightness modifications, highlighting certain features of the field-of-view, attaching augmented-reality annotations to some objects in the scene and combining multiple camera poses if the depth sensing module comprises a plurality of image sensors.

In yet another preferred embodiment of the method described above, the step of processing the volumetric information of the scene further comprises applying an adaptive resolution algorithm to the information obtained from the depth sensing system to reduce the spatial resolution of some regions of the scene. In this way, the size of the mesh files with the volumetric information is reduced, which enables a faster broadcasting with low latency.

In alternative embodiments of the method, colour information is also acquired and merged with the volumetric information. In this way, the method further comprises the following steps:

Acquiring colour information of a three-dimensional scene by using a colour sensor, for instance, a RGB sensor.

Reading and processing, via a vision processor, the colour information to obtain a plurality of colour images associated with the volumetric information of the scene.

Aligning the plurality of images containing the volumetric information of the scene and the plurality of colour images to obtain corrected colour images.

Overlaying the colourless point cloud with the corrected colour images to obtain a point cloud with colour information.

In certain embodiments, the synchronization of the compressed three-dimensional mesh files and the audio stream comprises annotating or labelling the compressed mesh and audio files with a timestamp. In this way it becomes easier for the server and the receiver to associate the volumetric information with the corresponding audio recording.

Further embodiments of the method of the disclosure further comprise a step of verifying the identity of the emitter or the end user before broadcasting videoconference information from said emitter to a receiving device. Particularly, these embodiments comprise the following sub-steps:

The emitter establishes a communication with a server, such that the server checks that a set of credentials provided by the emitter are valid to gain access to the system.

At least a receiver is authenticated by using proper credentials that are verified by the server before granting access to the system.

Once both ends of the communication, emitter, and receiver, are authenticated, the receiver asks the server for a transmission coming from the emitter.

Finally, additional embodiments of the method disclosed in this disclosure further comprise the following steps performed by the receiver:

Verifying the user credentials to authorize the reception of a transmission from the server.

If credentials are valid, receiving a plurality of packets comprising volumetric information of a three-dimensional scene with the corresponding synchronized audio stream and, optionally, the corresponding colour information.

Splitting the three-dimensional meshes of the volumetric information from the audio stream.

Rendering a three-dimensional representation of the meshes in a virtual or real-augmented three-dimensional environment.

Performing the spatial positioning of the audio stream with regard to the position of the three-dimensional mesh within the three-dimensional environment.

Displaying the three-dimensional representation of the three-dimensional environment with audio information for the user.

In the scope of this disclosure, the depth images comprise the volumetric information of the scene and are represented as 3D dimensional meshes.

Each of the aspects disclosed herein may include one or more of the features described in connection with any of the other disclosed aspects.

In one example, a system for broadcasting volumetric information from a first location to a second location is provided. The system may include a server and an emitter. The emitter may be configured to capture a scene, render three-dimensional information based on the scene, and transmit the three-dimensional information to the server. The system may also include a configuration application including a broadcast setting. The broadcast setting may include at least one of framerate information, field-of-view information, or spatial resolution information. The system may also include a receiving device configured to render a three-dimensional environment based on the three-dimensional information and to display the three-dimensional environment. The receiving device may be configured with a receiving application. The server is configured to transmit the three-dimensional information to the receiving device. The three-dimensional information rendered by the emitter may include a 3D mesh defining an image comprising volumetric information of an object and/or a person within the scene. The three-dimensional information rendered by the emitter may also include audio information of the scene. The server may be configured to process the three-dimensional information received from the emitter. The emitter may be configured to transmit the three-dimensional information to the server encoded as the 3D mesh. The configuration application may be configured to control a compression level of the audio information and a compression level of video information of the three-dimensional information.

In other aspects, a system for broadcasting volumetric information from a first location to a second location described herein may include one or more of the following features. The emitter may include: a depth sensing module configured to obtain position information of the object and/or the person within the scene; an audio acquisition module configured to record sound information of the scene; and/or a data processing board including a vision processor, an audio processor, a CPU, RAM, internal memory, a connectivity module, a power supply, and a GPU. The data processing board may be configured to process the position information received from the depth sensing module and/or the sound information from the audio acquisition module before transmitting the position information and/or the sound information to the server. The emitter may also include a color sensor acquiring color information of the scene and/or a thermal sensor. The data processing board may be further configured to process the color information before transmitting the color information to the server. The depth sensing module comprises an infrared emitter and at least two IR sensors. The depth sensing module comprises a LIDAR sensor. The audio acquisition module comprises a cardioid unidirectional microphone and/or a surround sound equipment. The colour sensor and/or the depth sensing module comprise a global shutter.

In one example, a method for broadcasting a three-dimensional videoconference is provided. The method may include the steps of: selecting a configuration setting of an emitter, via a configuration application, the configuration setting comprising at least one of a framerate, a spatial-resolution of a broadcasted image, a field-of-view of a scene, or an encoding and/or a compression algorithm for video and/or audio information; acquiring information of a three-dimensional scene by the emitter, the emitter rendering volumetric information of the three-dimensional scene as an image; filtering, via the emitter, the image based on the volumetric information of the three-dimensional scene; generating, via the emitter, an audio stream based on the configuration setting of the emitter; converting the volumetric information into a colorless point cloud, wherein the depth information of the three-dimensional scene is encoded in a dimension of the colorless point cloud; converting the colorless point cloud into a three-dimensional mesh comprising a plurality of triangles and a plurality of vertices by using Poisson surface algorithms; compressing the three-dimensional mesh according to the configuration application settings; generating synchronized mesh files by synchronizing the compressed three-dimensional mesh files and the audio stream; transmitting the synchronized mesh files along with the audio stream to a server; and transmitting the synchronized mesh files along with the audio stream from the server to a receiving device. The server may be configured to broadcast the volumetric information as a videoconference. The videoconference may be taking placing in a virtual environment or an augmented reality environment. The receiving device may be configured to render the three-dimensional environment that reconstructs the three-dimensional scene from the 3D mesh received by the receiving device.

In other aspects, a method for broadcasting three-dimensional videoconference described herein may include one or more of the following steps of features. The step of acquiring the information of the three-dimensional scene may include: spatially discretizing the three-dimensional scene as a grid; emitting an infrared dot pattern with an emitting device to inspect each point of the grid; and detecting, by the emitting device, a reflected dot pattern with regard to a position of the emitting device to obtain the three-dimensional positioning of objects within the three-dimensional scene. The method may further include: filtering the three-dimensional mesh comprising at least one of the following operations: applying segmentation algorithms to define the field-of-view in the scene by discarding scene portions beyond a maximum depth threshold; smoothing the image to avoid unnatural changes between different depths; performing brightness modifications; highlighting certain features of the field-of-view; and attaching augmented-reality annotations to the objects in the three-dimensional scene. The step of filtering the image based on the volumetric information of the scene further may include applying an adaptive resolution algorithm to the volumetric information to reduce the spatial resolution of a region of the scene. The method may further include: acquiring color information of the three-dimensional scene by using a colour sensor, wherein the color sensor is an RGB sensor; obtaining, via a vision processor, a plurality of color images associated with the volumetric information of the scene based on the color information; aligning the plurality of color images containing the volumetric information of the three-dimensional scene and the plurality of color images to obtain corrected color images; and overlaying the colorless point cloud with the corrected colour images to obtain a point cloud with color information. The step of generating the synchronized mesh files includes timestamping the compressed mesh files and the audio files. The method may further include the following verification steps before broadcasting videoconference information from an emitting device to a receiving device: the emitting device establishes a communication with the server, such that the server checks that a set of credentials provided by the emitter are valid to gain access to the system; at least a receiving device is authenticated by using proper credentials that are verified by the server before granting access to the system; and once both ends of the communication, emitting and receiving device, are authenticated, the receiving device requests the server a transmission coming from the emitter. The method may further include the following steps performed by a receiving device: verifying a user credential to authorize a reception of a transmission from the server; if the user credential is valid, receiving a plurality of packets comprising the volumetric information of the three-dimensional scene with the audio stream or the color information; splitting the three-dimensional mesh of the volumetric information from the audio stream; rendering a three-dimensional representation of the three-dimensional mesh in a virtual or real-augmented three-dimensional environment; performing the spatial positioning of the audio stream with regard to a position of the three-dimensional mesh within the virtual or real-augmented three-dimensional environment; and displaying the three-dimensional representation of the virtual or real-augmented three-dimensional environment with audio information. The receiving device may be configured to render a three-dimensional environment and display the synchronized mesh files along with the corresponding audio stream. The method may further include rendering a three-dimensional representation of the three-dimensional mesh in a virtual or real-augmented three-dimensional environment.

In one example, a method of broadcasting volumetric information from a first location to a second location is provided. The method may include the steps of: capturing, by an emitter, a scene; rendering, by the emitter, three-dimensional information based on the scene; transmitting, by the emitter, the three-dimensional information to a server; configuring a broadcast setting, the broadcast setting comprising at least one of framerate information, field-of-view information, or spatial resolution information; rendering, by a receiver, a three-dimensional environment based on the three-dimensional information; displaying the three-dimensional environment; transmitting, by the server, the three-dimensional information to the receiving device; and controlling a compression level of the audio information and a compression level of video information of the three-dimensional information. The three-dimensional information may include a 3D mesh defining an image comprising volumetric information of an object and/or a person within the scene. The three-dimensional information may also include audio information of the scene. The three-dimensional information transmitted to the server may be encoded as the 3D mesh.

Advantageous effects to be obtained by the present disclosure are not limited to the above-described effects, and other effects not mentioned herein may be clearly understood by those skilled in the art from the following description of the present disclosure.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures.

NUMERICAL REFERENCES USED IN THE DRAWINGS

In order to provide a better understanding of the technical features of the disclosure, the referred FIGS. 1-4 are accompanied of a series of numerical references which, with an illustrative and non limiting character, are hereby represented:

TABLE 00066

| (1) | Emitter device |
| (2) | Configuration application |
| (3) | Server |
| (4) | Receiving device |
| (5) | Board for data processing |
| (6) | Colour sensor (or RGB sensor) |
| (7) | Depth sensing module (or depth camera) |
| (8) | Audio acquisition module (or microphone) |
| (9) | Communication means |
| (10) | Infrared emitter |
| (11) | Infrared vision sensor (or depth sensors) |
| (12) | Power supply |
| (13) | Cooling subsystem |
| (14) | Device casing |

DETAILED DESCRIPTION OF THE DISCLOSURE

A preferred exemplary embodiment of the present disclosure, provided for illustrative but not limiting purposes, is hereby described.

The disclosure relates to a system adapted for broadcasting volumetric videoconferences in three-dimensional (3D) animated virtual or augmented-reality environments, through a device for transmitting representations of human users in real time, through an intermediate server in mesh format or depth video, along with audio information for the creation of immersive environments designed for human perception.

Figure 1:
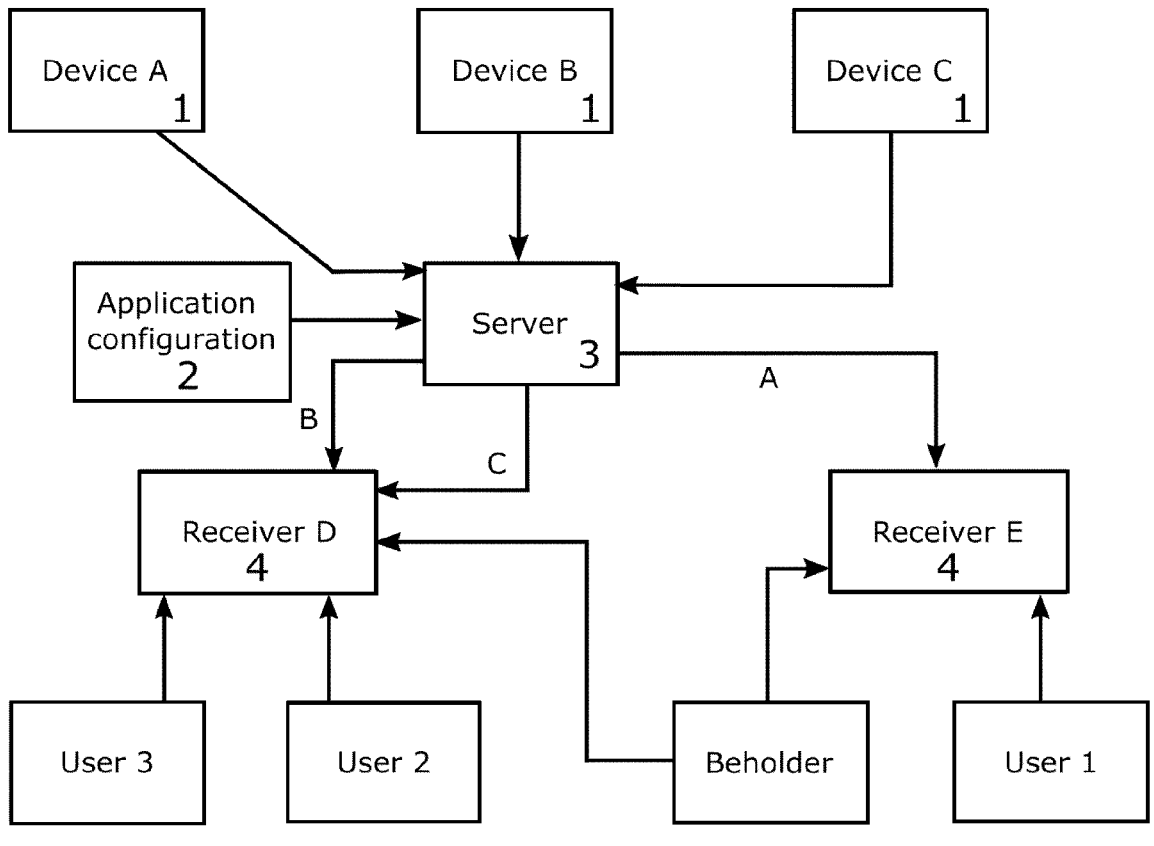
FIG. 1 shows a non-limiting exemplary embodiment of the disclosure, comprising a plurality of users, emitters (1) and receivers (4).

FIG. 1 illustrates a non-limiting example of a preferred embodiment of the disclosure, comprising: three emitting (1) devices (A, B and C); an application configuration (2) and a server (3) working as an intermediary between the emitters (1) and the receivers (4) and two receivers (4). Note that, in this embodiment, the devices B and C broadcast to the receiver (4) D, while the receiver (4) E only collects information from the device A. In this way, a receiver (4)

may receive multiple inputs from different emitters (1) in certain embodiments of the disclosure. The receiver (4) can be configured by means of the configuration application (2) to decide whether the plurality of inputs (videoconference streams) from the different emitters (1) are combined or displayed separately to the final user. It is worth pointing out that the final users require having the system to receive the fully immersive 3D videoconferences. However, one or more verified beholders (having received some kind of credentials, in case of limiting the audience of the videoconference) can visualise the content of the 3D videoconference as an external viewer.

Figure 2:
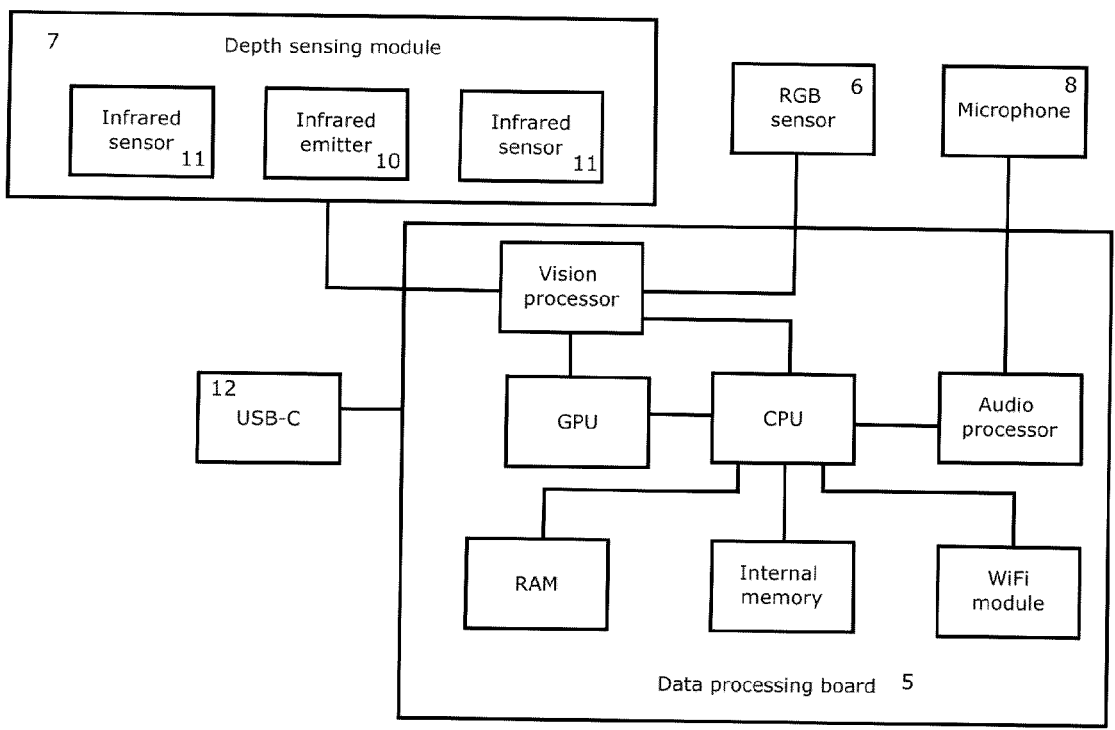
FIG. 2 corresponds to a schematic diagram with the main elements of the emitter (1).

In a preferred embodiment according to FIG. 2, the claimed disclosure comprises at least the following hardware means comprised on a data processing board (5): a colour sensor (6), a depth sensing module (7) able to obtain the position of an object in a three-dimensional space (including depth information), an audio acquisition module (8) and communication means (9). In yet a preferred embodiment, the colour sensor (6) is a RGB sensor, the depth sensing module (7) comprises an infrared (IR) emitter (10) and at least two infrared vision sensors (11), and the audio acquisition module (8) is a directional microphone. An USB-C connector (Universal Serial Bus Type-C) or any equivalent means can be used as a power supply (12) for the device.

The main applications of the disclosure are video conferencing between users in working or social environments, as well as providing a tool for a training environment. The applications comprise capturing volumetric images of a 3D scene (people and/or objects), together with one or more audio channels associated with them (e.g., surrounding sounds from a certain location or people in different places) to be transmitted to a shared virtual environment in real time. In this way, it enables virtual meetings with realistic audio stream to be held in immersive environments.

According to an optional embodiment of the disclosure, the system comprises, at least, four elements:

An emitting (1) device (or "emitter") adapted for capturing, rendering, and sending the 3D meshes over a network by means of communication means (9), like a Wi-Fi network. The emitter (1) hardware can be embedded in depth cameras.

A configuration application (2), to which the device (1) is linked through a central server (3) for its setup. The configuration application (2) controls the parameters of the emitter (1), for instance, the camera settings or visualisation options (framerate, resolution, etc.). Said configuration application (2) can be installed in any devices, such as a laptop or a mobile device of the user.

A receiving device (4) (or "receiver") configured with a receiving application which renders a 3D virtual environment of the scene from the 3D meshes that are received in the form of compressed files containing a plurality of mesh frames.

A server (3), working as an intermediate system in charge of synchronizing and validating the transmissions among different emitters (1) and receivers (4).

When the emitter (1) is started up, it automatically searches for a network (preferably Wi-Fi but any other wireless or wired network, a local area network or the like are also valid) to connect to. If the system does not find a suitable network, then it deploys a network by turning its own Wi-Fi into an access point so it can connect to another device (e.g., another nearby emitter (1)) in order to configure the Wi-Fi, through the communication means (9). Once connected to a valid Wi-Fi network, the emitter (1) starts trying to communicate with the server (3) by using credentials. Afterwards, if the emitter (1) is correctly registered, a communication between the server (3) and the emitter (1) is established.

When a receiver (4) tries to communicate with the server (3) by using the correct credentials, the system enables a communication between the receiver (4) and the server (3). The receiver (4) can be a Smart TV or a similar device able to display, in real time, a virtual representation of the 3D scene in a virtual room.

The registration of the device is carried out during its manufacturing, where unique identification is provided to each emitter (1). Then, preferably during the first use, credentials are created by the user in the registration of the emitter (1) on the online platform for gaining access to the system before launching it and considering said unique identification. On subsequent uses of the system, it is only required logging into the platform. Advanced techniques for renewing the credentials and further security features (encryption, etc.) can be defined, under request of the user. The receivers (4) must have credentials for gaining access to the content provided by the emitters (1).

In a preferred embodiment of the disclosure, the system comprises a mobile control app as the configuration application (2) which communicates with the server (3) linked to the emitter (1), being this app able to configure the camera settings (both the depth camera and colour sensor parameters) or to adjust other parameters of broadcast content. In yet another preferred embodiment of the disclosure, the configuration application (2) is executed by the receiver (4).

The receiving application can be hosted on receiving devices (4) themselves or, alternatively, on web servers (in the cloud). The receivers (4) display representations of virtual 3D environments that simulate real assets (places and/or people) where various broadcasts can be viewed simultaneously by users and/or beholders (viewers that do not have the videoconference system, but they want to watch the scene).

The process followed by the emitter (1) is described as follows (see also FIG. 3). For starting up the emitter (1), the following arrangements must be met:

The emitter (1) must establish a correct communication with the server (3).

A receiver (4), authenticated with proper credentials, must request to view the transmission of the emitter (1).

Once the above conditions are satisfied, the software means of the emitter (1) are configured to perform the following steps (main process of the system, as also summarized in FIG. 3) during a communication with a server (3):

Turning on the depth sensing module (7), also referred to as depth camera. The IR emitter (10) generates an infrared dot pattern in the environment of the scene to inspect it (i.e., by using an equally spaced grid, by making it denser in those regions of the field-of-view closer to the camera, etc.) for subsequent imaging during the videoconference. In this way, the 3D positioning data of a grid of points within the field-of-view are generated. Then, the IR sensors (11) gather IR intensity measurements coming from said grid points (or dots) and, provided that the distance between both sensors (11) is known, the depth of each dot of the pattern within the scene can be uniquely obtained. In this step, these settings are applied so that the broadcast meshes comply with these requirements.

Arranging the 3D camera settings of the emitter (1) according to the configuration application (2) parameters. The configuration application (2) enables the adjustment of several options: desired image resolution, the maximum depth of the scene that is considered for the broadcast (the field-of-view beyond such a depth is discarded to speed up the transmission), the compression level of the mesh, etc.

Reading the transmission of depth and colour streams emitted by the visualisation camera of the scene (comprising a person or an object to be imaged) along with reading the audio stream from, at least, one microphone integrated into the device or placed in the scene or its surroundings. The system reads the colour images acquired by the colour sensor (6), the depth images obtained by the set of IR emitter (10) and IR depth sensors (11), and the audio stream recorded by the microphone (8).

Cleaning and filtering the depth video comprising the depth information of the scene. Depth images, generated by the set of IR emitter (10) and IR depth sensors (11), are filtered and segmented by different algorithms which remove portions of the field-of-view beyond the maximum depth configured in the step c), smooth the image (i.e., by applying interpolation) to avoid unnatural changes between various depths and apply any further processing considered necessary to improve the quality of the 3D videoconference (i.e., for providing an enhanced resolution to certain objects in the scene depending on a saliency map, brightness modifications, highlighting certain features, attaching augmented-reality annotations to some objects in the scene, etc.). If more advance depth sensing modules (7) are available (with multiple cameras), in this step it is also processed the video to provide smooth different viewpoint transitions, for instance, by interpolating different camera poses in order to render the 3D scene in a seamless way.

Applying an adaptive resolution reduction algorithm according to the depth where different objects in the scene are located. Thanks to this algorithm, the degree of detail is reduced in distant portions of the field-of-view (i.e., by lowering the spatial resolution) while keeping the maximum resolution available in those regions close to the emitter (1), thereby improving the transmission speed of the content.

Converting both the depth video and colour video into a point cloud. The emitter (1) aligns the colour and depth images, and it removes all colour points in the colour image that do not match a point in the filtered depth image. Once the two images alignment (colour and depth images) coincide, a cloud of colourless points is generated from the depth image by encoding the depth information as the third coordinate for each point in the cloud (i.e., by varying the grayscale of each point in the depth image depending on the depth). After obtaining this point cloud without colour, the colour of the corrected (aligned) colour image is overlaid to it, thereby synchronizing both of them point to point. It is worth pointing out that, preferably, the colour sensor must provide a higher resolution than the depth sensor.

Converting the point cloud into a 3D mesh comprising a plurality of vertices, by means of Poisson algorithms. In this way, the point cloud with colour information becomes a mesh composed of triangles and vertices, each vertex containing the colour information for displaying it in colour.

Compressing the 3D mesh containing volumetric and colour information per each vertex, depending on the compression level previously configured in the configuration application (2). In this way, the size of the meshes containing colour information in each vertex is reduced so that they can be broadcast without demanding Wi-Fi bandwidth requirements. The compression provides a more efficient and faster transmission over a network (Internet, etc.).

Synchronizing the compressed mesh files and the audio stream. Preferably, the compressed mesh files are labelled (or annotated) with a timestamp containing univocal information of the moment in which they were created. Then, considering the timestamps, the audio files are synchronized with the compressed mesh with colour information such that they are transmitted together without having an offset between them.

Sending the compressed mesh files together with the corresponding audio streams to the server (3), by using the credentials (in particular, the built-in hardware credentials) to gain access for establishing the communication with said server (3).

Figure 3:
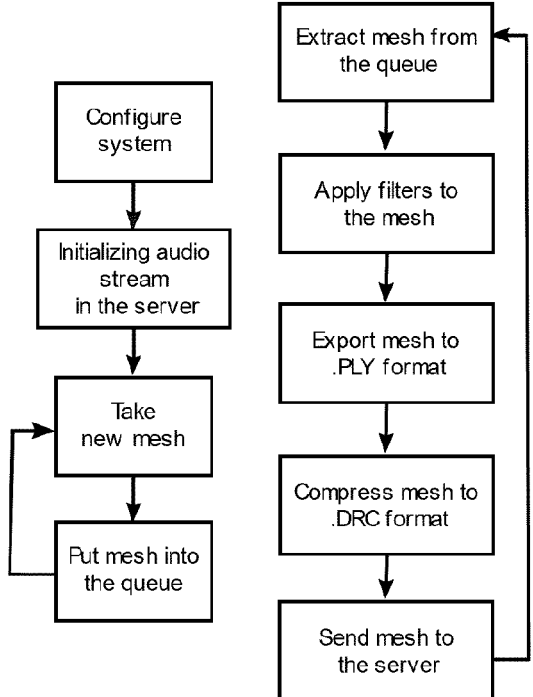
FIG. 3 shows the workflow followed by the emitter (1) for broadcasting the videoconference information before sending it to the server (3).

FIG. 3 summarizes the typical workflow performed by the emitter (1) to arrange the volumetric mesh before sending it to the server (3), in agreement with the previous steps. Preferably, the meshes with audio information are sent following a FIFO (first in-first out) scheme to the server (3). For this reason, they are queued for temporal storing while the processing steps are carried out before sending them to the server (3).

In a preferred embodiment, the 3D mesh is formatted as PLY (Polygon File Format or Stanford Triangle Format) files, which is open-source and supports a relatively simple description of the object as a list of flat polygons (tessellation); while it further enables storing colour, transparency, texture, and other additional information. However, this format is not limitative and other embodiments can use different formats (standard or customized, for instance, COLLADA which is based on XML or X3D standard) for the 3D mesh, provided that they are able to store 3D information and additional information (colour, texture, etc.).

Advantageously, certain embodiments compress the 3D mesh file to obtain DRC (Draco) files, commonly used in broadcasting. Alternatively, other compression techniques can be used (preferably lossless compression, like ZIP or RAR formats).

The receiving application of the receiver (4) performs the following steps to receive the transmission from an emitter (1):

Verifying if the credentials of the users entered through the receiving application are correct and authorizing the transmission if they are valid.

Receiving a plurality of packets (comprising volumetric stream with colour information and synchronized audio stream related to information of a scene) from authorized users.

The receiving application of the receiver separates the volumetric stream from the audio, as well as it extracts the meshes of the volumetric stream.

Rendering a three-dimensional representation of the mesh in the 3D environment.

Performing the spatial positioning of the audio stream with regard to the position of the 3D mesh.

The central server (3) is the intermediary between the emitting (1) devices and the receiving devices (4), being responsible for validating that the nodes, either receiving devices (4) or applications, trying to establish a communication with the system are authenticated. Only if the authentication is successful, the communication is carried out. The limit of users or simultaneous devices is defined by the maximum number of users that can be stored by the server (3) depending on its capacity and visualisation options (image and sound quality, formats, etc.). In this way, the system is scalable as it only requires increasing the server (3) capacity if a higher number of users need to be stored. Indeed, the procedure followed by the server (3) is described below:

When the server (3) receives any communication from an emitter (1) device, it verifies the authenticity thereof.

In the event that no receiver (4) is requesting transmission, the receiver (4) does not start the broadcast.

When a receiving (4) device requests a transmission to the emitter (1), the server (3) verifies the authenticity of said receiving (4) device. Note that the server, in these cases, comprises storing means (a database) for providing a fast and reliable lookup table with users and corresponding credentials.

Once it is verified that there is a receiving (4) device demanding a transmission from the emitter (1), it is sent the proper settings of the configuration application (2) to the emitter (1), followed by the initialisation of the emitter (1) software.

The transmission is sent to the one or more receiving (4) devices requesting it.

The receivers (4) functionality can be improved and expanded by including artificial intelligence systems able to enhance the meshes with interpolations, to complete those areas of the field-of-view which have not been seen by the camera, to decide the more convenient scene key points to be tracked and sampled for enabling subsequent scene reconstruction, among other functions.

In a preferred embodiment, the claimed disclosure comprises at least the following hardware means: a RGB sensor (6), an infrared emitter (10) and two infrared vision sensors (11) along with a directional microphone (8) mounted on a data processing board that also includes a high-speed connectivity (mainly Wi-Fi) module. In particular, in this preferred embodiment, the system comprises an emitter (1) integrated in a depth camera which provides volumetric images (depth images) of a field-of-view, the emitter (1) comprising:

A colour (RGB) sensor (6), with a resolution of 1920× 1080 pixels and a minimum framerate of 30 frames per second (fps), further including a global shutter and a HVD viewfinder providing a minimum range of vision of 69.4°× 42.5°×77° (within a range of ±3°). This sensor (6) collects colour images of the field-of-view observed by the emitter (1) and then it combines said colour images with depth images to create a point cloud including colour information. The colour information is processed by the vision processor along with the depth images, described below.

Experimental setup for obtaining volumetric data (including depth information) for capturing a 3D scene which is later processed by a vision processor. In particular, this setup comprises two infrared vision sensors with one infrared (IR) emitter configured to acquire depth images of 1280×720 pixels at a minimum framerate of 30 fps (to provide a seamless communication), each sensor comprising a global shutter and providing a minimum range of vision of 86°×57° (within a range of ±3°). The infrared emitter (10) generates an IR dot pattern in the field-of-view on its surroundings. Then, the two IR sensors (11) performs the detection of said pattern with respect to the IR emitter (10) in order to calculate the depth (for an accurate 3D positioning of objects within the field-of-view) corresponding to each point of the pattern, considering the separation between the IR sensors (11) to derive said position in a unique way. These depth data, obtained by the IR depth sensors, are converted into a grayscale image that is combined with the colour image to create a point cloud comprising colour information. Advantageously, the set of IR sensors (11) and emitter (10) is affordable and exhibits a low-power consumption, as well as it enables easy data processing.

A directional microphone (8), for instance, a cardioid unidirectional microphone (8) with a minimum gain of −44 dB and highly sensitive frequency response between 20 Hz and 20 KHz. This unidirectional microphone (8) works to acquire the audio from the environment of the scene, so that it is later processed by an audio processor in order to synchronize and transmit said audio information along with 3D volumetric mesh.

Data processing means, comprising a customized electronic board (5) for video and audio processing, which in turn contains a computer processing unit (CPU), in particular a microprocessor, a vision processor, a high-speed Wi-Fi module, random access memory (RAM), solid state internal memory and a graphic processing unit (GPU). The colour (RGB) sensors, along with the electronics for depth sensing and audio acquisition (directional microphone (8)) are embedded in the customized electronic board (5). The board (5) performs the entire data processing by considering the data inputs received from the microphone (8), colour sensors (6) and the depth sensing module (7), in this case, the set composed of IR emitter (10) and IR sensors (11). The elements of this data processing board (5) are described below in greater detail.

The GPU assists the video processing board and the CPU with regard to data calculations. This component is not necessary if the CPU comprises an integrated graphics processing unit, however, it improves the final user experience in the 3D videoconference (the CPU is freed from graphics-related tasks) and provides a seamless communication.

The vision processor is dedicated to the processing of the raw data acquired by the vision sensors in order to obtain image and depth images, by making use of the GPU of the electronic board (5). These images are then used by the CPU for computing the volumetric 3D mesh which may optionally include colour information encoded in the vertices.

The CPU executes the main process of the emitter (1) while further running the secondary processes needed for the operation of the system (establishment of communications, credentials verification, etc.). This is performed by taking advantage of the GPU, the video processor, and the audio processor. The maximum framerate provided by the system during the 3D videoconference mainly depends on the CPU performance, along with the communication quality provided by the Wi-Fi module (bandwidth, delay, etc.).

The audio processor receives the signals recorded by a microphone (8), preferably built into the electronic board, and process them (formatting, digitization, cleaning, filtering, synchronizing, etc.) for its use by the main process executed by the CPU.

The internal memory stores the software instructions associated with the main process executed by the CPU, along with all the child (secondary) processes. Moreover, the electronic board (5) comprises RAM (Random Access Memory), providing fast swapping between different tasks performed by the system (data processing, communication, formatting, etc.).

The communication module (preferably a Wi-Fi module) is crucial to reduce the delay between transmissions. Moreover, the board (5) may comprise or be attached to additional connectivity means.

Figure 4:
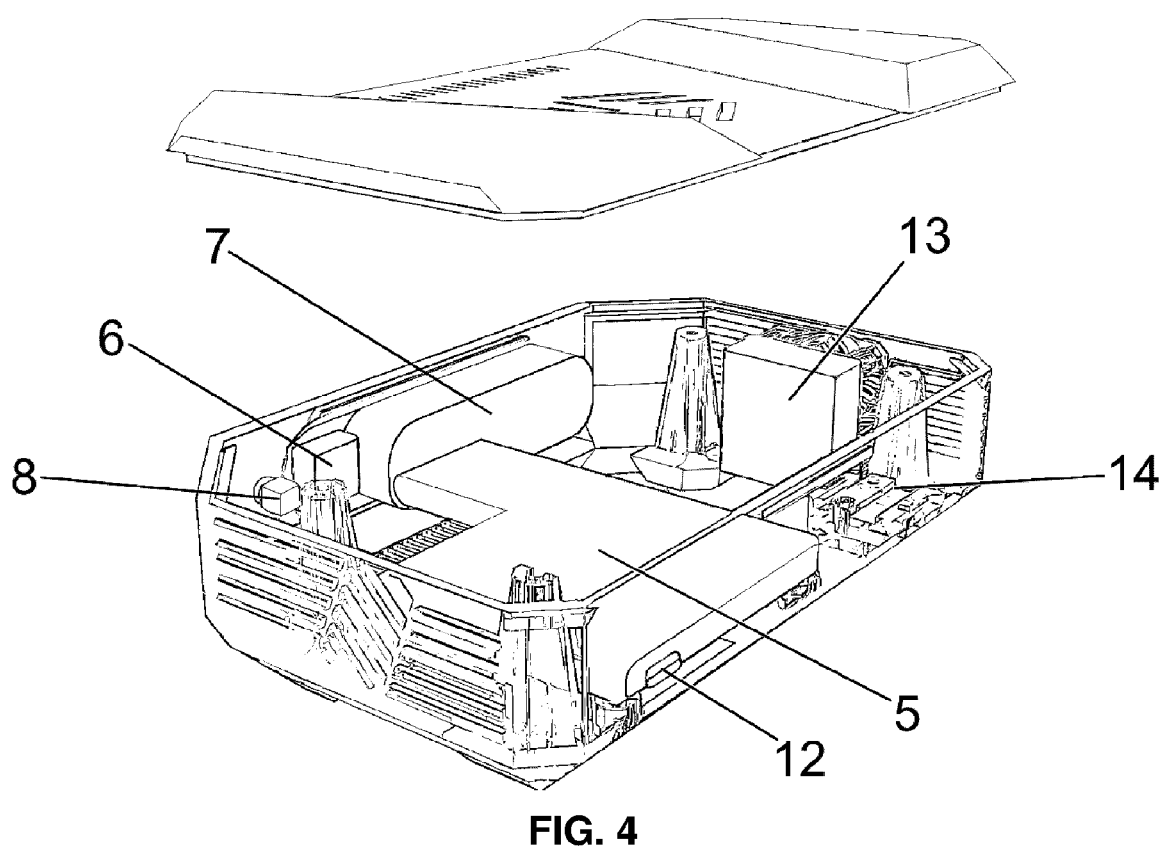
FIG. 4 illustrates a 3D rendering of the emitter (1) of the disclosure comprising an open cover and a casing is open.

FIG. 4 corresponds to a 3D rendering of the emitter (1) hardware according to a preferred embodiment of the disclosure, comprising a unidirectional microphone (8), a RGB sensor (6), the set of IR emitter (10) and sensors (11), a cooling subsystem (13) like a fan to avoid overheating, the device casing (14), the board (5) for data processing and the power supply (12), i.e., an USB-C connector which can be also applied for communication and data storing.

The audio is encoded in OPUS format, which provides with a very short latency and then it is transmitted to the server (3) by using TCP/IP. Alternatively, other implementations of the disclosure may include different audio formats, depending on the available bandwidth in the communication. For the broadcasting of audio and video streams, TCP/IP (Transmission Control Protocol/Internet protocol) is used.

In alternative embodiments, the set of infrared sensors (11) and emitter (10) can be replaced by a LIDAR sensor in order to obtain depth images of the scene. The remaining elements of the hardware setup remain as previously described. Other implementations of the disclosure may comprise any other set of sensors able to acquire information of a 3D scene (volumetric information, including depth at which the objects/people are placed), so as to generate depth images in a vision processor. Regardless the particular implementation of the setup responsible for depth information acquisition, it must comprise a global shutter or the like to avoid motion artifacts (e.g., a LIDAR setup).

In yet another embodiment, the emitter (1) device can be replaced by a computer attached to a 3D camera and configured to run software means equivalent to that of the emitter (1). However, this fact may cause some disadvantages such as the need of a different installation depending on the operative system and versions thereof, as well as the lack of standardization of the system.

In certain embodiments, the colour sensor (6) is not mandatory, but the 3D mesh would only contain volumetric information (for example, in applications where grayscale or black and white images are enough, such that the colour information is not required). In those cases, the processing of the emitter (1) skips those steps related to the colour information (such as the alignment of depth and colour images).

In alternative embodiments, the colour information can be replaced by another type of information, like a thermal image (in this case, one or more thermal sensors are required to sample and discretize the temperature of the 3D scene) or any other additional information which could be encoded (i.e., augmented-reality annotations in certain objects or people present in the scene). In those cases, for the rest of the system, the rest of the system remains without changes with the exception of the data processing board (5) which further comprises the processing means needed for adapting the raw information obtained by the thermal sensor or the additional sensors to a proper format before being transmitted to the server (3).

In some embodiments of the disclosure, the microphone (8) can be replaced by any other audio sensor (either one or more microphones) for acquiring the audio stream from the 3D scene (i.e., surround sound setup) and able to establish a communication with the audio processor for its processing. Alternatively, other embodiments omit any audio sensor if the audio information is not required, thus only broadcasting the 3D mesh in these cases.

The invention claimed is:

1. A system for broadcasting volumetric information from a first location to a second location, the system comprising:
   a server;
   an emitter configured to:
   capture a scene;
   render three-dimensional information based on the scene, wherein the three-dimensional information comprises a 3D mesh and audio information of the scene, the 3D mesh defining an image comprising volumetric information of an object or a person within the scene; and transmit the three-dimensional information to the server encoded as the 3D mesh;

a configuration application adapted to control a broadcast setting for the three-dimensional information, the broadcast setting including spatial resolution information, and compression level of the three-dimensional information; and a receiving device configured to render a three-dimensional environment based on the three-dimensional information and to display the three-dimensional environment, the receiving device being configured with a receiving application, wherein the server is configured to transmit the three-dimensional information to the receiving device.

2. The system according to claim 1, wherein the emitter comprises:

a depth sensing module configured to obtain position information of the object and/or the person within the scene;

an audio acquisition module configured to record sound information of the scene; and/or a data processing board comprising a vision processor, an audio processor, a CPU, RAM, internal memory, a connectivity module, a power supply, and a GPU, wherein the data processing board is configured to process the position information received from the depth sensing module and/or the sound information from the audio acquisition module before transmitting the position information and/or the sound information to the server.

3. The system according to claim 1, wherein the emitter further comprises a color sensor acquiring color information of the scene and/or a thermal sensor, and wherein the data processing board is further configured to process the color information before transmitting the color information to the server.

4. The system according to claim 1, wherein the depth sensing module comprises an infrared emitter and at least two IR sensors.

5. The system according to claim 1, wherein the depth sensing module comprises a LIDAR sensor.

6. The system according to claim 2, wherein the audio acquisition module comprises a cardioid unidirectional microphone and/or a surround sound equipment.

7. The system according to claim 3, wherein the color sensor and/or the depth sensing module comprise a global shutter.

8. A method for broadcasting a three-dimensional videoconference, the method comprising the steps of:

selecting a configuration setting of an emitter, via a configuration application, the configuration setting comprising a spatial-resolution of a scene, or an encoding and/or a compression algorithm for video and/or audio information;

acquiring information of a three-dimensional scene by the emitter, the emitter rendering volumetric information of the three-dimensional scene as an image;

filtering, via the emitter, the image based on the volumetric information of the three-dimensional scene;

generating, via the emitter, an audio stream based on the configuration setting of the emitter;

converting the volumetric information into a colorless point cloud, wherein the depth information of the three-dimensional scene is encoded in a dimension of the colorless point cloud;

converting the colorless point cloud into a three-dimensional mesh comprising a plurality of triangles and a plurality of vertices;

compressing the three-dimensional mesh according to the configuration application settings;

generating synchronized mesh files by synchronizing the compressed three-dimensional mesh files and the audio stream;

transmitting the synchronized mesh files along with the audio stream to a server; and transmitting the synchronized mesh files along with the audio stream from the server to a receiving device.

9. The method according to claim 8, wherein the step of acquiring the information of the three-dimensional scene comprises:

spatially discretizing the three-dimensional scene as a grid;

emitting an infrared dot pattern with an emitting device to inspect each point of the grid; and detecting, by the emitting device, a reflected dot pattern with regard to a position of the emitting device to obtain the three-dimensional positioning of objects within the three-dimensional scene.

10. The method according to claim 8, wherein the step of filtering the image based on the volumetric information of the scene further comprises applying an adaptive resolution algorithm to the volumetric information to reduce the spatial resolution of a region of the scene.

11. The method according to claim 8, further comprising:

acquiring color information of the three-dimensional scene by using a colour sensor, wherein the color sensor is an RGB sensor;

obtaining, via a vision processor, a plurality of color images associated with the volumetric information of the scene based on the color information;

aligning the plurality of color images containing the volumetric information of the three-dimensional scene and the plurality of color images to obtain corrected color images; and overlaying the colorless point cloud with the corrected colour images to obtain a point cloud with colour information.

12. The method according to claim 8, wherein the step of generating the synchronized mesh files comprises timestamping the compressed mesh files and the audio files.

13. The method according to claim 8, comprising the following verification steps before broadcasting videoconference information from an emitting device to a receiving device:

the emitting device establishes a communication with the server, such that the server checks that a set of credentials provided by the emitter are valid to gain access to the system;

at least a receiving device is authenticated by using proper credentials that are verified by the server before granting access to the system; and once both ends of the communication, emitting and receiving device, are authenticated, the receiving device requests the server a transmission coming from the emitter.

14. The method according to claim 8, further comprising the following steps performed by a receiving device:

verifying a user credential to authorize a reception of a transmission from the server;

if the user credential is valid, receiving a plurality of packets comprising the volumetric information of the three-dimensional scene with the audio stream or the color information;

splitting the three-dimensional mesh of the volumetric information from the audio stream;

rendering a three-dimensional representation of the three-dimensional mesh in a virtual or real-augmented three-dimensional environment;

performing the spatial positioning of the audio stream with regard to a position of the three-dimensional mesh within the virtual or real-augmented three-dimensional environment; and displaying the three-dimensional representation of the virtual or real-augmented three-dimensional environment with audio information.

15. The method of claim 8, wherein the receiving device is configured to render a three-dimensional environment and display the synchronized mesh files along with the corresponding audio stream.

16. The method of claim 8, further comprising rendering a three-dimensional representation of the three-dimensional mesh in a virtual or real-augmented three-dimensional environment.

17. The system of claim 1, wherein the server is configured to broadcast the volumetric information as a videoconference, and the configuration application is adapted to control the compression level of the three-dimensional information according to the bandwidth available for the videoconference;

wherein the videoconference is taking placing in a virtual environment or an augmented reality environment.

18. The system of claim 1, wherein the receiving device is configured to render the three-dimensional environment that reconstructs the three-dimensional scene from the 3D mesh received by the receiving device.

19. A method of broadcasting volumetric information from a first location to a second location, the comprising the steps of:

capturing, by an emitter, a scene;

rendering, by the emitter, three-dimensional information based on the scene, wherein the three-dimensional information comprises a 3D mesh and audio information of the scene, the 3D mesh defining an image comprising volumetric information of an object or a person within the scene;

transmitting, by the emitter, the three-dimensional information to a server encoded as the 3D mesh;

configuring a broadcast setting, the broadcast setting including spatial resolution information, and compression level of the three-dimensional information;

rendering, by a receiver, a three-dimensional environment based on the three-dimensional information; displaying the three-dimensional environment;

transmitting, by the server, the three-dimensional information to the receiving device.

20. The system of claim 1, wherein the broadcast setting comprises at least one of a framerate, or a field-of-view of the scene.

21. The method of claim 8, wherein the configuration setting comprises at least one of a framerate, or a field-of-view of the scene.

22. The method of claim 19, wherein the broadcast setting comprises at least one of framerate information, or a field-of-view information.

23. The method according to claim 19, further comprises:

broadcasting the volumetric information as a videoconference, and controlling the compression level of the three-dimensional information according to the bandwidth available for the videoconference.

24. The system according to claim 20, further comprising: filtering the three-dimensional mesh comprising at least one of the following operations: applying segmentation algorithms to define the field-of-view in the scene by discarding scene portions beyond a maximum depth threshold; smoothing the image to avoid unnatural changes between different depths; performing brightness modifications; highlighting certain features of the field-of-view; and attaching augmented-reality annotations to the objects in the three-dimensional scene.

* * * * *